United States Patent [19]

Saito et al.

[11] Patent Number: 5,367,036

[45] Date of Patent: Nov. 22, 1994

[54] MOISTURE-CURABLE URETHANE-BASED SEALING COMPOSITION

[75] Inventors: Hitoshi Saito, Hiratsuka; Tetsuji Kitamura; Hideyuki Matsuda, both of Fujisawa; Masamichi Danjo, Hadano; Eiji Nishi, Hiratsuka, all of Japan

[73] Assignee: The Yokohama Rubber Co., Ltd., Tokyo, Japan

[21] Appl. No.: 965,786

[22] Filed: Oct. 23, 1992

[30] Foreign Application Priority Data

Oct. 23, 1991 [JP] Japan .................................. 3-275497
Mar. 9, 1992 [JP] Japan .................................. 4-050912

[51] Int. Cl.$^5$ ......................................... C08F 283/04
[52] U.S. Cl. ..................................... 525/458; 525/440; 525/454; 525/457; 525/460; 528/60; 528/66; 528/67
[58] Field of Search ............... 525/440, 454, 457, 458, 525/460; 528/60, 66, 67

[56] References Cited

U.S. PATENT DOCUMENTS

| | | | |
|---|---|---|---|
| 4,824,888 | 4/1989 | Emmerling et al. | 524/199 |
| 5,061,555 | 10/1991 | Edenbaum et al. | 428/253 |
| 5,173,538 | 12/1992 | Gilch et al. | 525/130 |
| 5,180,632 | 1/1993 | Edenbaum et al. | 428/253 |

FOREIGN PATENT DOCUMENTS

| | | |
|---|---|---|
| 0289901 | 11/1988 | European Pat. Off. . |
| 0456917 | 11/1991 | European Pat. Off. . |
| 04684051 | 1/1992 | European Pat. Off. . |
| 232189 | 2/1990 | Japan . |
| 2182774 | 7/1990 | Japan . |
| 2137638 | 10/1984 | United Kingdom . |

*Primary Examiner*—James J. Seidleck
*Assistant Examiner*—Mary Critharis
*Attorney, Agent, or Firm*—Finnegan, Henderson, Farabow, Garrett & Dunner

[57] ABSTRACT

A moisture-curable urethane-based sealing composition is made up of an urethane prepolymer and a polyurethane compound blended together in specified amounts. The urethane prepolymer is derivable by reacting a selected class of polyether polyols with a selected class of polyisocyanate compounds. The polyurethane compound is available by reacting a selected class of polyether or polyester polyols with a selected class of polyisocyanate compounds, followed by reaction of the resulting prepolymer with a selected class of monoalcohols to thereby binder all isocyanate groups in the prepolymer. The ultimate sealant is adequate in initial adhesion strength, low in glass transition temperature and resistant to moist heat.

16 Claims, 1 Drawing Sheet

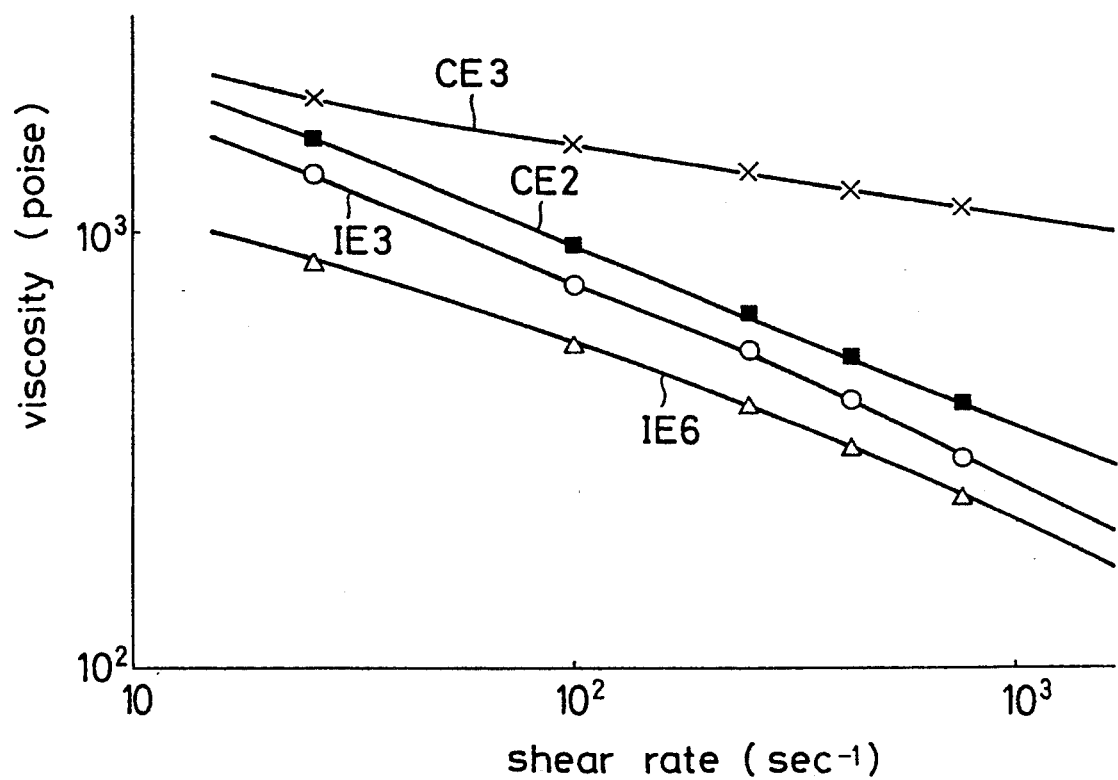

MOISTURE-CURABLE URETHANE-BASED SEALING COMPOSITION

BACKGROUND OF THE INVENTION

1. Field of the Invention

This invention relates to moisture-curable urethane-based sealing compositions of a hot-melt type and has particular reference to such a sealing composition for firm attachment of window panes to window frames in the assembly of automotive vehicles.

2. Description of the Prior Art

Different polymer compositions usually called reactive-type hot-melt adhesives are known which suit with coating in a melted state and induce initial adhesion strength upon solidification with temperature drop and subsequently produce final physical quality upon completion of cure reaction. As disclosed for instance in Japanese Patent Laid-Open Publication No. 2-32189, a moisture-curable hot-melt sealant is made up predominantly of a polyether polyol-based urethane prepolymer in which a polyether polyol is used in combination with a polyester polyol. Further, Japanese Patent Laid-Open Publication No. 2-182774 teaches a rapid-curable hot-melt urethane composition which results from blending a polyether polyol having a relatively small molecular weight and a higher glass transition temperature than room temperature with an urethane prepolymer having a relatively large molecular weight and a lower glass transition temperature than room temperature.

The above hot melts are in widespread use in various sectors of industry. In the automobile sector, such type of hot melt is applied as a sealant in fixedly securing window panes to window frames. To this end, the sealant is required to preclude objectionable sagging or running when coated onto a substrate and to develop adequate initial adhesion strength when solidified on cooling, leading to sufficient elasticity and durability when cured completely. The term initial adhesion strength used herein refers to an after-coat period of time required for the sealant to hold the window pane in firmly fixed relation to the window frame. Initial adhesion strength is preferred to be at a level as short as about 10 minutes from the productivity point of view. Sufficient magnitudes of elasticity and durability are needed over a wide range of temperatures and as regards elasticity even at about $-40°$ C., namely at a glass transition temperature of not higher than $-40°$ C., because cars are sometimes used under such adverse conditions in cold territories. Durability is dominated by the resistance to moist heat.

Reactive-type hot-melt adhesives, composed mainly of polyether polyol-based urethane prepolymers, have been found to be too low in cohesiveness before cure to be effective in giving initial adhesion strength. Their inherent physical properties, therefore, will develop depending upon the progress and completion of cure reaction.

The hot-melt sealant of the first-mentioned publication No. 2-32189 is formulated to improve cohesion by the addition of a polyester polyol. Although acceptable in initial adhesion strength, this prior art sealant is less resistant to moist heat due to the polyester segment being liable to become hydrolyzed after cure. Moreover, in addition to its too high a glass transition temperature of about $-10°$ C., the sealant involves low thixotropy prior to cure, thus entailing tedious coating onto a substrate. Thixotropy is a phenomenon in which a viscous liquid shows a decline in viscosity when subjected to mechanical force and on the converse a rise in viscosity when brought to a standstill.

The hot-melt sealant disclosed in the last-mentioned publication No. 2-182774 is designated to laminate film sheets together into an integral structure. This sealant is satisfactory in respect of initial adhesion strength and moist heat resistance but to an extent to invite too high a level of glass transition temperatures, resulting in inadequate elasticity at low temperature.

SUMMARY OF THE INVENTION

With the foregoing drawbacks of the prior art in view, the present invention seeks to provide a moisture-curable urethane-based sealing composition which will exhibit not only high thixotropy before cure and hence good coatability and adequate initial adhesion strength at a relatively low melt temperature but also low glass transition temperature and sufficient moist heat resistance over a wide range of temperatures, contributing greatly to enhanced adhesion of panes onto car bodies and also to improved quality of the ultimate car.

More specifically, the invention provides a moisture-curable urethane-based sealing composition comprising (I) an urethane prepolymer resulting from reaction of a polyether polyol having a number-average molecular weight of 1,000 to 7,000 with a polyisocyanate compound in an equivalent ratio of isocyanate group to hydroxyl group of 1.1 to 2.5 and (II) a polyurethane compound containing no free isocyanate groups and resulting from reaction of a polyether polyol having a number-average molecular weight of 500 to 3,000 or a polyester polyol having a number-average molecular weight of 500 to 6,000 with a polyisocyanate compound in an equivalent ratio of isocyanate group to hydroxyl group of 1.1 to 2.5 and from subsequent reaction of the resultant intermediate prepolymer with a monoalcohol having a carbon number of 1 to 22 to thereby binder all isocyanate groups in the intermediate prepolymer, wherein components (I) and (II) are blended in a total amount of 100 parts by weight, and component (I) is added in an amount of 81 to 99 parts by weight and component (II) in an amount of 1 to 19 parts by weight.

BRIEF DESCRIPTION OF THE DRAWINGS

The accompanying drawing graphically represents the viscosity characteristics of several inventive and comparative sealants as plotted against the shear rates varied.

DETAILED DESCRIPTION OF THE INVENTION

The moisture-curable urethane-based sealing composition of the present invention is made up essentially of a selected urethane prepolymer (I) and a selected polyurethane compound (II) blended together in specified amounts.

The urethane prepolymer hereunder referred to as component (I) is derived by reacting a polyether polyol of 1,000 to 7,000 in number-average molecular weight with a polyisocyanate compound.

The polyether polyol useful in component (I) is a product obtainable by addition polymerization of one or more alkylene oxides with a two or more active hydrogen atoms-containing compound. Alkylene oxides include ethylene oxide, propylene oxide, butylene oxide, tetrahydrofuran and the like. Active hydrogen atoms-containing compounds include polyalcohols, amines, alkanolamines and polyphenols, polyalcohols being chosen from ethylene glycol, propylene glycol, butane diol, diethylene glycol, glycerin, hexane triol, trimethylol propane, pentaerythritol and the like, amines from ethylene diamine, hexamethylene diamine and the like, alkanolamines from ethanolamine, propanolamine and the like, and polyphenols from resorcinol, bisphenol and the like. The number-average molecular weight of the polyether polyol is in the range of 1,000 to 7,000. Less than 1,000 in molecular weight would make the resulting sealant objectionably high in glass transition temperature, whereas more than 7,000 in molecular weight would lead to physical deterioration after cure.

The polyisocyanate compound used as a coreactant in component (I) may be chosen from those commonly accepted for the manufacture of urethane resins. Specific examples include 2,4-tolylene diisocyanate, 2,6-tolylene diisocyanate, phenylene diisocyanate, xylene diisocyanate, diphenylmethane-4,4'-diisocyanate, naphthalene-1,5-diisocyanate and hydrogenates thereof, ethylene diisocyanate, propylene diisocyanate, tetramethylene diisocyanate, hexamethylene diisocyanate, isophorone diisocyanate, triphenylmethane triisocyanate and the like. These compounds may be used alone or in combination.

To obtain component (I), the polyether polyol is reacted with the polyisocyanate compound in an equivalent ratio of isocyanate group to hydroxyl group of 1.1 to 2.5. The isocyanate group is peculiar to the polyisocyanate compound and the hydroxyl group to the polyether polyol. Smaller ratios would render that component too viscous to warrant practical application. Greater ratios would leave much polyisocyanate compound reacted, causing insufficient resistance to foaming during sealant formulation. Though not specifically restricted, the reaction may be effected in conventional manner, for example, at a temperature of about 50° to 100° C. and under atmospheric pressure and if necessary with use of an urethanation catalyst such as a tin or bismuth compound of an organic class.

The polyurethane compound eligible as another essential component in the invention, hereunder referred to as component (II), is derived by reacting a polyether polyol of 500 to 3,000 in number-average molecular weight or a polyester polyol of 500 to 6,000 in number-average molecular weight with a polyisocyanate compound in an equivalent ratio of isocyanate group to hydroxyl group of 1.1 to 2.5, followed by subsequent reaction of the resulting prepolymer with a monoalcohol of 1 to 22 in carbon number to thereby binder all isocyanate groups in the prepolymer. Thus, component (II) is by nature devoid of free isocyanate groups.

The polyether polyol used in preparing component (II) is similar to that described above in connection with component (I). The polyether polyol of component (II), however, ranges in number-average molecular weight from 500 to 3,000. The molecular weight if below 500 would give too high a level of glass transition temperatures and if above 3,000 would lead to slow crystallization during reaction and thus render the final sealant incapable of developing initial adhesion strength.

The polyester polyol useful also in component (II) may be a polycondensate of a polybasic acid such as a dibasic acid with a polyhydroxyl compound such as a glycol. Suitable polybasic acids include adipic acid, sebacic acid, phthalic acid, maleic acid, glutaric acid and the like. Polyhydroxyl compounds typically include ethylene glycol, diethylene glycol, butylene glycol, neopentyl glycol, hexane glycol, trimethylol propane, glycerine pentaerythritol and the like. Polyester polyols other than the polycondensate may be suitably used in which included are a polycarbonate polyol configured to have two alkylene groups bonded side by side via a carbonate likage, and a lactone-type polyester polyol obtained by ring open polymerization of a monomeric caprolactone. The polyester polyol has a number-average molecular weight of 500 to 6,000. Smaller than 500 in molecular weight would not be effective in reducing glass transition temperature to a desired level. Larger than 6,000 in molecular weight would make component (II) less compatible with component (I), failing to develop initial adhesion strength.

The polyisocyanate compound suitable as a coreactant in component (II) is substantially of the same as in component (I). Details as regards this coreactant will require no further explanation.

The monoalcohol useful as another coreactant in component (II) is chosen from those monoalcohols of a straight or branched, saturated or unsaturated nature and of 1 to 22 in carbon number. Particularly preferred are straight saturated monoalcohols of 2 to 12 carbon atoms.

To obtain component (II), the polyether or polyester polyol is allowed to react with the polyisocyanate compound in an equivalent ratio of isocyanate group to hydroxyl group of 1.1 to 2.5. This ratio is the equivalent of the isocyanate group of the polyisocyanate compound relative to the hydroxyl group of the polyether or polyester polyol. Smaller ratios would make the resulting intermediate urethane prepolymer too viscous and less compatible with component (I). Greater ratios would involve slow crystallization, failing to develop initial adhesion strength. No particular restriction is imposed upon the reaction which, however, may be conveniently performed at a temperature of about 50° to 100° C. and under atmospheric pressure and where desired in the presence of an urethanation catalyst such as an organic tin or bismuth compound. The intermediate urethane prepolymer thus prepared is thereafter reacted with the monoalcohol to binder all isocyanate groups in the prepolymer, whereby component (II) is provided. The monoalcohol is added in such an amount that its hydroxyl group is made excessive of the isocyanate group of the prepolymer, usually in an equivalent ratio of 0.5 to 1.0. Reaction conditions may be set at from 50° to 100° C. and at atmospheric pressure and with removal of excess alcohol upon completion of the reaction.

Component (II) according to the invention serves to act as a viscoisty builder that can develop adequate initial adhesion strength without any rise in glass transition temperature. This component does not participate in reacting with component (I) in the formulation of the sealant of the invention.

In the practice of the invention, components (I) and (II) are blended in a total amount of 100 parts by weight. Component (I) is added in an amount of 81 to 99 parts by weight and component (II) in an amount of 1 to 19 parts by weight. Departures from the specified amount of component (II) are responsible for quality deterioration. Component (II) if below 1 part would not be effective in developing initial adhesion strength and if above 19 parts would cause too high a level of glass transition temperatures or otherwise unacceptable elasticity at low temperature.

Various additives commonly known in the art may be employed which include plasticizers, fillers, thixotropic agents, tackifiers, catalysts, ultraviolet absorbers, dyes, pigments, flame retardants and the like. For instance, typical plasticizers are chosen from derivatives of benzoic acid, phthalic acid, trimellitic acid, pyromellitic acid, adipic acid, sebacic acid, fumaric acid, maleic acid, itaconic acid and citric acid and of polyester, polyether and epoxy and the like. Suitable fillers are silicic acid derivatives, talc, metallic powder, calcium carbonate, clay, carbon black and the like. Thixotropic agents typically include benton, anhydrous silicic acid, urea derivatives and the like. Eligible catalysts include dibutyltin dilaurate, dioctyltin dilaurate, zinc octylate, organic bismuth compounds, triethyldiamine, amine compounds such as morpholine amine and the like.

One preferred form of the sealant according to the invention is formulated, provided that 1 to 19 parts by weight of component (II) is added per 100 parts by weight of components (I) and (II), such that when the total weight of the sealant is taken as 100% by weight, 30 to 50% of component (I) and not more than 10% of component (II) are blended with less than 50% of a given filler and less than 20% of other additives.

The sealing composition of the invention may be prepared by admixing components (I) and (II) and selected additives with melting at from about 40° to 80° C. The resulting sealant is coatable at about 40° to 80° C. onto either one or both of two substrates and capable of fastly developing initial adhesion strength upon solidification with cooling, producing elasticity and durability upon curing within a relatively short period of time.

The following examples are given to further illustrate the invention. In these examples, all parts are indicated by weight and all number-average molecular weights by Mn unless otherwise noted.

INVENTIVE EXAMPLES 1 TO 6

One inventive urethane prepolymer (A-1) and six inventive polyurethane compounds (B-1 to B-6) were prepared which were formulated into different moisture-curable urethane-based sealants according to the invention as shown in Table 1. All these sealants were checked for initial adhesion strength with the results indicated also in Table 1.

Preparation of Urethane Prepolymer (1) A-1

In a reactor were placed 57 parts of polypropylene triol of 3 in hydroxyl number and of 5,000 in Mn and 23 parts of polypropylene ether of 2 in hydroxyl number and of 2,000 in Mn. In vacuo dewatering was done at 50 mmHg and at 110° C. for 2 hours, followed by cooling to 80° C. To the system was added with stirring 9.1 parts of a mixture of 2,4-tolylene diisocyanate and 2,6-tolylene diisocyanate (80:20). The whole mixture was reacted to a free isocyanate level of 2.2%, whereupon a tolylene diisocyanate prepolymer (TDI) was obtained.

The TDI prepolymer was incorporated with 19.6 parts of diphenylmethane-4,4'-diisocyanate and subjected to stirring. To the system were added 85 parts of polyoxypropylene triol of 5,000 in Mn and 35 parts of polypropylene ether diol of 2,000 in Mn, both having been previously dewatered, and the whole mixture was reacted at 80° C. until free isocyanate was made available at 1.8%. A diphenylmethane-4,4'-diisocyanate prepolymer (MDI) was provided as an urethane prepolymer (A-1).

Preparation of Polyurethane Compounds (1) B-1

Into a reactor was put 100 parts of polyethylene ether diol of 1,000 in Mn which was then dewatered in vacuo at 50 mmHg and at 110° C. for 2 hours and cooled to 80° C. To the system was added with stirring 43 parts of diphenylmethane-4,4'-diisocyanate. Reaction was continued to a free isocyanate level of 4.1%.

The resulting reaction product was incorporated with 21 parts of n-hexyl alcohol, followed by reaction until free isocyanate was found nil. Removal of excess alcohol yielded a polyurethane compound (B-1).

(2) B-2

Into a reactor was put 100 parts of polypropylene ether diol of 700 in Mn which was then dewatered in vacuo at 50 mmHg and 110° C. for 2 hours and cooled to 80° C. To the system was added with stirring 50 parts of diphenylmethane-4,4'-diisocyanate. Reaction was continued to a free isocyanate level of 3.2%.

The resulting reaction product was incorporated with 46 parts of stearyl alcohol, followed by reaction until free isocyanate was found nil. Removal of excess alcohol yielded a polyurethane compound (B-2).

(3) B-3

Into a reactor was put 100 parts of polytetramethylene ether diol of 1,000 in Mn which was then dewatered in vacuo at 50 mmHg and at 110° C. for 2 hours and cooled to 80° C. To the system was added with stirring 33 parts of hexamethylene diisocyanate. Reaction was continued to a free isocyanate level of 6.2%.

The resulting reaction product was incorporated with 30 parts of n-hexyl alcohol, followed by reaction until free isocyanate was found nil. Removal of excess alcohol yielded a polyurethane compound (B-3).

(4) B-4

Into a reactor was put 100 parts of adipate-type polyester diol of 2,000 in Mn which was then dewatered in vacuo at 50 mmHg and at 110° C. for 2 hours and cooled to 80° C. To the system was added with stirring 17 parts of hexamethylene diisocyanate. Reaction was continued to a free isocyanate level of 3.6%.

The resulting reaction product was incorporated with 15 parts of n-hexyl alcohol, followed by reaction until free isocyanate was found nil. Removal of excess alcohol yielded a polyurethane compound (B-4).

(5) B-5

Into a reactor was put 100 parts of polycarbonate diol of 2,000 in Mn which was then dewatered in vacuo at 50 mmHg and at 110° C. for 2 hours and cooled to 80° C. To the system was added with stirring 17 parts of hexamethylene diisocyanate. Reaction was continued to a free isocyanate level of 3.6%.

The resulting reaction product was incorporated with 15 parts of n-hexyl alcohol, followed by reaction until free isocyanate was found nil. Removal of excess alcohol yield a polyurethane compound (B-5).

(6) B-6

Into a reactor was put 100 parts of polycaprolactone diol of 2,000 in Mn which was then dewatered in vacuo at 50 mmHg and at 110° C. for 2 hours and cooled to 80° C. To the system was added with stirring 17 parts of hexamethylene diisocyanate. Reaction was continued to a free isocyanate level of 3.6%.

The resulting reaction product was incorporated with 15 parts of n-hexyl alcohol, followed by reaction until free isocyanate was found nil. Removal of excess alcohol yielded a polyurethane compound (B-6).

Preparation of Moisture-Curable Urethane-Based Sealants

Into a nitrogen-filled kneader were charged 85 parts of the urethane prepolymer (A-1), 15 parts of each of the polyurethane compounds (B-1 to B-6), 20 parts of a dewatered plasticizer, 100 parts of dry carbon black and 10 parts of anhydrous calcium carbonate. Full kneading was done in vacuo. To the mixture was added 1.7 parts of a 5% dioctyl phthalate solution of octyl tin dilaurate, followed by full kneading in vacuo, whereby six inventive sealants were provided.

Comparative Example 1

A commercially available moisture-curable urethane-based sealant was used which has been marketed as WS-70 by the Yokohama Rubber Co., Ltd.

Comparative Example 2

A commercially available moisture-curable urethane-based sealant was used which has been marked as WS-100F by the Yokohama Rubber Co., Ltd.

Comparative Example 3

Preparation of Polyester Polyol/Polyether Polyol Urethane Prepolymer

In a reactor were placed 142 parts of polyester triol of 5,000 in Mn, 58 parts of polyether diol of 2,000 in Mn and 50 parts of an adipate plasticizer. In vacuo dewatering was done at 50 mmHg and at 110° C. for 2 hours, followed by cooling to 80° C. To the system was added with stirring 24 parts of hexamethylene diisocyanate. The whole mixture was reacted to a free isocyanate level of 2.2%, thereby giving a polyester polyol/polyether polyol urethane prepolymer.

Preparation of Moisture-Curable Urethane-Based Sealant

Into a nitrogen-filled kneader were charged 100 parts of the urethane prepolymer obtained above, 20 parts of a dewatered plasticizer, 100 parts of dry carbon black and 10 parts of anhydrous calcium carbonate. Full kneading was performed in vacuo. To the mixture was added 1.7 parts of a 5% dioctyl phthalate solution of octyl tin dilaurate, followed by full kneading in vacuo, whereby a comparative sealant was provided.

Performance Evaluation

H-Type Initial Adhesion Strength before Cure

The sealants of Inventive Examples 1 to 6 and the counterpart of Comparative Example 3 were melted and coated at 80° C., whereas the sealants of Comparative Examples 1 and 2 were coated at 20° C. All the coated sealants were let to stand at a temperature of 20° C. and at a relative humidity of 65% for a period of time of 10 minutes, followed by measurement of H-type tensile strength.

As evidenced by the test data in Table 1, the sealants of Inventive Examples 1 to 6 have been proved to develop fast crystallization and hence initial adhesion strength within 10 minutes after coating. The sealants of Comparative Examples 1 and 2 revealed no such strength. This means that with initial adhesion strength only, the inventive sealants can fix a window pane to a window frame in automobile construction.

The sealant of Comparative Example 3 is substantially comparable in initial adhesion strength to those of Inventive Examples 3 and 6. To demonstrate further distinction, thixotropy and moist heat resistance characteristics were measured as mentioned later.

Thixotropy before Cure

The sealants of Inventive Examples 3 and 6 and of Comparative Example 3 were measured in their respective viscosities against the varied shear rates as stipulated by JIS K-2220. Measurement was done at 80° C., at which the sealants were coated, with the results shown in Table 2.

The inventive sealants are less viscous and highly thixotropic and hence coatable at a small jet pressure as by a robot and without sagging or running. The comparative sealant of Comparative Example 3 failed to meet those benefits as a whole.

Resistance to Moist Heat after Cure

After being melted at 80° C., the sealants of Inventive Examples 3 and 6 and of Comparative Example 3 were sheeted to a thickness of 3 mm. Hardness was examined for a sheet cured at 20° C. for 9 days and a sheet cured at 20° C. for 3 days and maintained at 80° C. for 7 days in humid condition. Determination of tensile strength (TB) and elongation (EB) was made by JIS K-6301 with the results shown in Table 2. The comparative sealant became unacceptably clayey upon exposure to moist heat.

TABLE 1

| | Runs | | | | | | | | |
|---|---|---|---|---|---|---|---|---|---|
| | Inventive Examples | | | | | | Comparative Examples | | |
| | 1 | 2 | 3 | 4 | 5 | 6 | 1 | 2 | 3 |
| urethane prepolymer | A-1 | A-1 | A-1 | A-1 | A-1 | A-1 | — | — | — |
| polyurethane compound | B-1 | B-2 | B-3 | B-4 | B-5 | B-6 | — | — | — |
| initial adhesion strength (kg/cm$^2$) | 0.25 | 0.17 | 0.45 | 0.25 | 0.10 | 0.40 | 0.05 | 0.05 | 0.40 |

TABLE 2

| | | Runs | | | |
|---|---|---|---|---|---|
| | | Inventive Examples | | Comparative Examples | |
| | | 3 | 6 | 2 | 3 |
| storage at room temperature | hardness | 55 | 56 | 55 | 73 |
| | TB (kg/cm$^2$) | 51.7 | 55.0 | 50.7 | 83.5 |
| | EB (%) | 430 | 480 | 405 | 300 |
| storage under moist heat condition | hardness | 49 | 51 | 43 | * |
| | TB (kg/cm$^2$) | 50.5 | 57.0 | 72.4 | |
| | EB (%) | 480 | 450 | 417 | |

*measurement impossible

What is claimed is:

1. A moisture-curable urethane-based sealing composition comprising:

(I) an urethane prepolymer resulting from the reaction of a polyether polyol having a number-average molecular weight of 1,000 to 7,000 with a polyisocyanate compound in an equivalent ratio of isocyanate group to hydroxyl group of 1.1 to 2.5; and (II) a polyurethane compound containing no free isocyanate groups and resulting from the reaction of a polyether polyol having a number-average molecular weight of 500 to 3,000 or a polyester polyol having a number-average molecular weight of 500 to 6,000 with a polyisocyanate compound in an equivalent ratio of 1.1 to 2.5 and from the subsequent reaction of the resultant intermediate prepolymer with a monoalcohol having a carbon number of 1 to 22 to thereby binds all isocyanate groups in the intermediate prepolymer, wherein components (I) and (II) are blended in a total amount of 100 parts by weight, and component (I) is added in an amount of 81 to 99 parts by weight and component (II) in an amount of 1 to 19 parts by weight.

2. The sealing composition of claim 1 wherein the polyether polyol in each of components (I) and (II) is derived by addition polymerization of at least one alkylene oxide with a two or more active hydrogen atoms-containing compound.

3. The sealing composition of claim 2 wherein the alkylene oxide is selected from the group consisting of ethylene oxide, propylene oxide, butylene oxide and tetrahydrofuran.

4. The sealing composition of claim 2 wherein the two or more active hydrogen atoms-containing compound is selected from the group consisting of ethylene glycol, propylene glycol, butane diol, diethylene glycol, glycerin, hexane triol, trimethylol propane and pentaerythritol.

5. The sealing composition of claim 2 wherein the two or more active hydrogen atoms-containing compound is selected from the group consisting of ethylene diamine and hexamethylene diamine.

6. The sealing composition of claim 2 wherein the two or more active hydrogen atoms-containing is selected from the group consisting of ethanol amine and propanol amine.

7. The sealing composition of claim 2 wherein the two or more active hydrogen atoms-containing compound is selected from the group consisting of resorcinol and bisphenol.

8. The sealing composition of claim 1 wherein the polyisocyanate compound in each of components (I) and (II) is selected from the group consisting of 2,4-tolylene diisocyanate, 2,6-tolylene diisocyanate, phenylene diisocyanate, xylene diisocyanate, diphenylene-4-4′-diisocyanate, naphthalene-1,5-diisocyanate and a hydrogenate thereof, ethylene diisocyanate, propylene diisocyanate, tetramethylene diisocyanate, hexamethylene diisocyanate, isophorone diisocyanate and triphenylene methane triisocyanate either alone or in combination.

9. The sealing composition of claim 1 wherein the polyester polyol in component (II) is a polycondensate of a polybasic acid with a polyhydroxyl compound.

10. The sealing composition of claim 9 wherein the polybasic acid is selected from the group consisting of adipic acid, sebacic acid, phthalic acid, maleic acid and glutaric acid.

11. The sealing composition of claim 9 wherein the polyhydroxyl compound is selected from the group consisting of ethylene glycol, diethylene glycol, butylene glycol, neopentyl glycol, hexane glycol, trimethylol propane, glycerine and pentaerythritol.

12. The sealing composition of claim 1 wherein the polyester polyol in component (II) is selected from the group consisting of a polycarbonate polyol having two alkylene groups bonded side by side via a carbonate linkage and a lactone-type polyester polyol resulting from ring open polymerization of a caprolactone monomer.

13. The sealing composition of claim 1 wherein the monoalcohol is a straight or branched, saturated or unsaturated monoalcohol.

14. The sealing composition of claim 13 wherein the monoalcohol is a straight saturated monoalcohol of 2 to 12 in carbon number.

15. The sealing composition of claim 1 wherein components (I) and (II) are blended with melting at from about 40° to 80° C.

16. The sealing composition of claim 1 further including a plasticizer, a filler, a thixotropic agent and a catalyst.

* * * * *